United States Patent
Ajmera et al.

(10) Patent No.: US 10,157,203 B2
(45) Date of Patent: Dec. 18, 2018

(54) QUESTION TRANSFORMATION IN QUESTION ANSWER SYSTEMS

(71) Applicant: International Business Machines Corporation, Armonk, NY (US)

(72) Inventors: Jitendra Ajmera, Bangalore (IN); Ajay K. Gupta, New Delhi (IN); Sachindra Joshi, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 15/070,339

(22) Filed: Mar. 15, 2016

(65) Prior Publication Data

US 2017/0270120 A1    Sep. 21, 2017

(51) Int. Cl.
G06F 7/00         (2006.01)
G06F 17/30        (2006.01)
G06F 17/27        (2006.01)

(52) U.S. Cl.
CPC ...... *G06F 17/3043* (2013.01); *G06F 17/2785* (2013.01); *G06F 17/30401* (2013.01)

(58) Field of Classification Search
CPC .......... G06F 17/30401; G06F 17/3043; G06F 17/2785
USPC ........................................ 707/705, 730, 760
See application file for complete search history.

(56) References Cited

U.S. PATENT DOCUMENTS 7,984,032 B2    7/2011   Thione et al.
8,898,159 B2    11/2014  Brown et al.
2013/0224714 A1*  8/2013  Ajmera ..................... G09B 7/00
                                                 434/322
2014/0141401 A1*  5/2014  Agarwal ................ G09B 19/00
                                                 434/359

OTHER PUBLICATIONS

Hartrumpf, Sven, "Semantic Decomposition for Question Answering", Appeared in In Proceedings of the 18th European Conference on Artificial Intelligence (ECAI 2008), Patras, Greece, 5 pages, retrieved on line Mar. 4, 2016, (<pi7.femuni-hagen.de/papers/hartrumpf08_online.pdf>.
Kalyanpur et al., "Fact-based question decomposition in DeepQA", IBM J. Res. & Dev., vol. 56, No. 3/4, Paper 13, May/Jul. 2012, Digital Object Identifier: 10.1147/JRD.2012.2188934, 11 pages, © Copyright 2012 by International Business Machines Corporation.
Saquete et al., Splitting Complex Temporal Questions for Question Answering systems*, Proceedings of the 42nd Annual Meeting on Association for Computational Linguistics, ACL '04, Article No. 566, Association for Computational Linguistics, Stroudsburg, PA, USA, © 2004, doi>10.3115/1218955.1219027, 10 pages.

* cited by examiner

*Primary Examiner* — Md I Uddin
(74) *Attorney, Agent, or Firm* — Steven L. Fisher-Stawinski; William H. Hartwell

(57) ABSTRACT

A computer-implemented method includes receiving a question. The question is directed to a question answering system. The method includes extracting two or more queries from the question. The method includes generating two or more question sets, each of the two or more question sets addressing all of the two or more queries. The method includes selecting one of the two or more question sets to yield a selected question set, based on analyzing each of the two or more question sets according to a pre-trained model. The method includes presenting the selected question set to the question answering system.

15 Claims, 4 Drawing Sheets

QUESTION TRANSFORMATION IN QUESTION ANSWER SYSTEMS

BACKGROUND

The present invention relates generally to the field of question answering systems and more particularly to transforming questions in question sets.

Question answering is a computer science discipline within the fields of information retrieval and natural language processing. Question answering is concerned with building systems that answer questions posed by human users in a natural language. Question answering systems may take a natural language question as input and transform the natural language question into a query through the natural language question's logical form. Question answering systems continue to face difficulties interpreting questions.

SUMMARY

A computer-implemented method includes receiving a question. The question is directed to a question answering system. The method includes extracting two or more queries from the question. The method includes generating two or more question sets, each of the two or more question sets addressing all of the two or more queries. The method includes selecting one of the two or more question sets to yield a selected question set, based on analyzing each of the two or more question sets according to a pre-trained model. The method includes presenting the selected question set to the question answering system. A corresponding computer program product and computer system are also disclosed.

DETAILED DESCRIPTION

Figure 1:
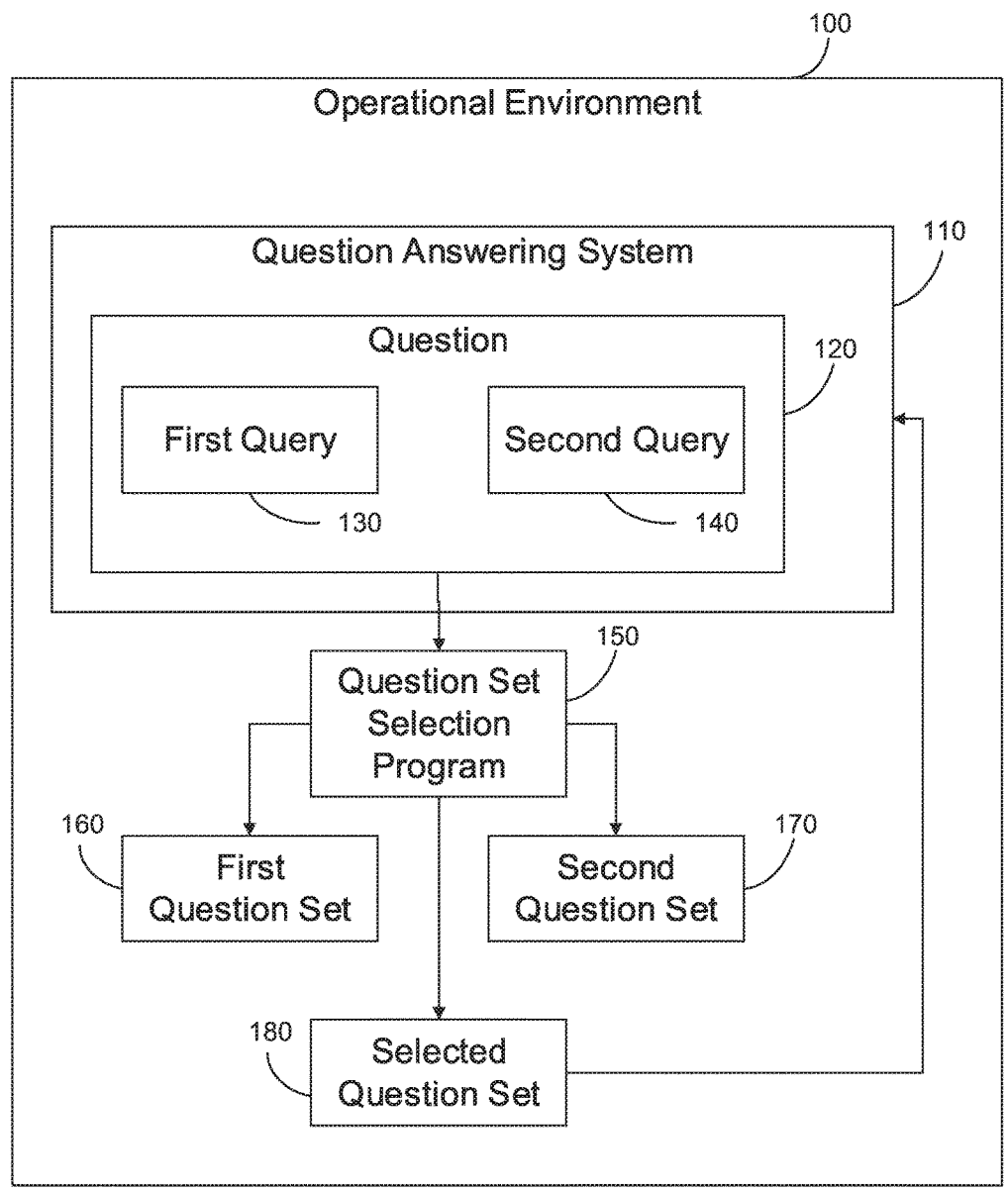
FIG. 1 is a block diagram of a computing environment suitable for operation of a question set selection program in accordance with at least one embodiment of the present invention.

Referring now to the invention in more detail, FIG. 1 is a block diagram displaying an exemplary computing environment suitable for operation of at least one embodiment of the invention. An operational environment 100 includes a question answering system 110, a question 120, a first query 130, a second query 140, a question set selection program 150, a first question set 160, a second question set 170, a selected question set 180, all in mutual communication and interconnected via the operational environment 100. The operational environment 100 may be a cloud-based, virtual, or distributed environment or a remote environment on defined server hardware, or, more generally, the operational environment 100 may be any type of environment suitable for access by the question answering system 110 or the question set selection program 150.

The question answering system 110 is a system for information retrieval via natural language processing. The question answering system 110 may be a computer program, analytics engine, and/or device capable of accessing a database of knowledge or information. The question answering system 110 may be a domain-specific question answering system, such as for use in medical or scientific settings. The question answering system 110 may be IBM® Watson®. The question answering system 110 may be a general purpose analytics engine.

The question 120 is a linguistic expression expressed in a natural language, such as English. The question 120 may be making a request for information. The question 120 is for the question answering system 110. The question 120 has at least two distinct queries, the first query 130 and the second query 140. The question 120 is requesting at least two distinct pieces of information. For example, the question 120 may be "what is the population of the largest city in the United States?" In such an example, the question 120 has a first distinct query, "what is the largest city in the United States," and a second distinct query, "what is the population of the largest city in the United States." In another example, the question 120 may be "what are the three most populated cities in the United States?" In such an example, the question 120 has three distinct queries, one for the most populated city in the United States, one for the second most populated city in the United States, and one for the third most populated city in the United States. In another example, the question 120 may be "which United States presidents were born in Virginia?" In such an example, the question 120 may have a distinct query for each United States President, such as "was this United States President born in Virginia?"

In the above example, "what is the population of the largest city in the United States?" the first query 130 and the second query 140 were not explicitly stated in the question 120. The first query 130 and the second query 140 may be expressed as natural language questions. The first question set 160 is the first query 130 and the second query 140 expressed as natural language questions. In the above example, the first question set 160 may be questions "what is the largest city in the United States?" and "what is the population of the largest city?" The second question set 170 is a question set similar to the first question set 160. Both the second question set 170 and the first question set 160 include at least one question for each of the queries associated with the question 120, such as the first query 130 and the second query 140. The second question set 170 includes at least one question different from the first question set 160. For example, the second question set 170 may also include a question "what are the cities in the United States?" In another example, the second question set 170 may have an entirely different set of questions as long as the second question set 170 addresses each query within the question 120.

The question set selection program 150 receives the question 120 from the question answering system 110 as input. The question set selection program 150 extracts the first query 130 and the second query 140. The question set selection program 150 generates the first question set 160 and the second question set 170 based on the first query 130 and the second query 140. The question set selection program 150 selects the selected question set 180. The selected question set 180 is one of either the first question set 160 or the second question set 170. The question set selection program 150 may be a dedicated client computer program. The question set selection program 150 may be a function of the question answering system 110.

Figure 2:
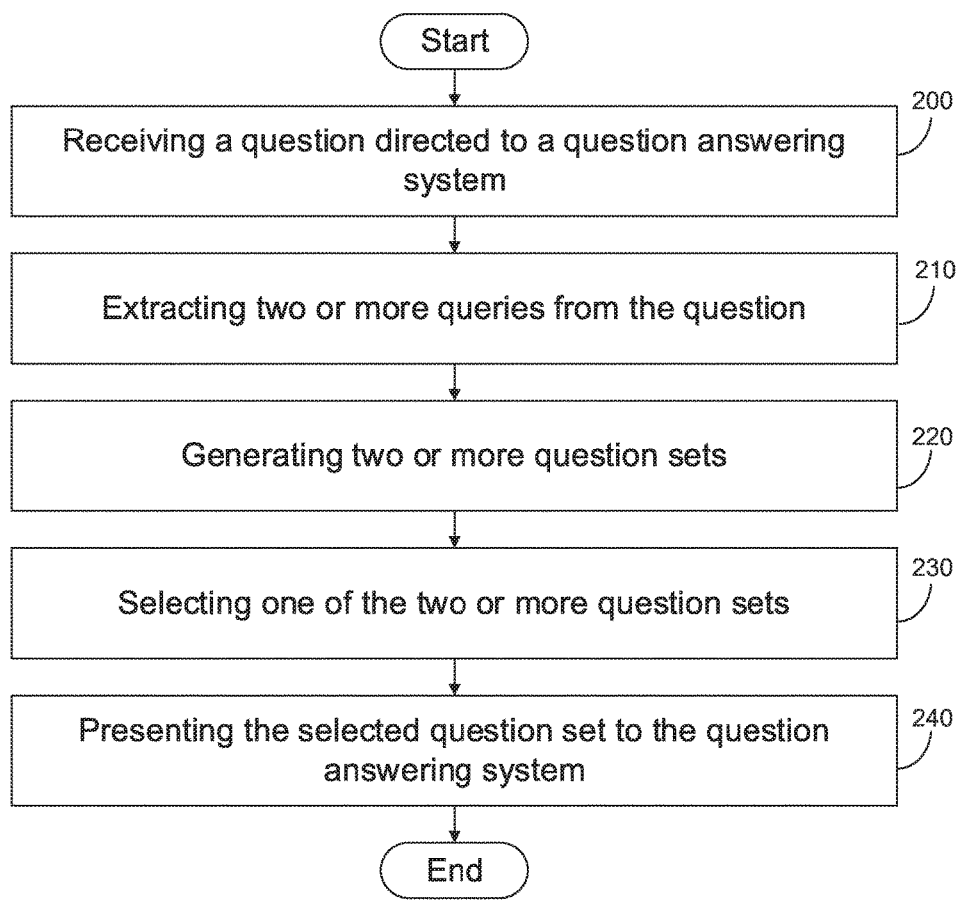
FIG. 2 is a flowchart depicting operational steps for a question set selection program in accordance with at least one embodiment of the present invention.

FIG. 2 is a flowchart depicting the operational steps of the question set selection program 150, executing within the operational environment 100 of FIG. 1, in accordance with an embodiment of the present invention.

At step 200 the question set selection program 150 receives a question, such as the question 120, directed to a question answering system, such as the question answering system 110. Receiving may include a user explicitly calling the question set selection program 150 from a command line interface using a reference to the question 120 as an argument. Alternatively, receiving may include automated calls to the question set selection program 150, for example, from an integrated development environment or as part of a question set selection program management system.

At step 210 the question set selection program 150 extracts two or more queries, such as the first query 130 and the second query 140, from the question 120. Extracting two or more queries includes identifying two or more queries from the question 120. In some embodiments, extracting two or more queries includes expressing the two or more queries in a natural language, such as English. In other embodiments, extracting two or more queries includes expressing the two or more queries in a way that is understandable by the question answering system 110. Extracting two or more queries from the question 120 may be based on a semantic rule or on multiple semantic rules. For example, a semantic rule may be a rule for a conjunction such as "and." For example, the question set selection program 150 may identify distinct clauses that are separated by the conjunction "and," and extract the distinct clauses as distinct queries.

In some embodiments, the question set selection program 150 may access a query decomposing rule library. The query decomposing rule library may include any combination of semantic, syntactic, grammatical, structural, and other pre-determined rules for identifying distinct queries within the question 120. The question set selection program 150 may compare the question 120 to the query decomposing rule library. Comparing may include using an index scan, using a keyword scan, parsing the query decomposing rule library, and/or using a segment scan. By comparing the question 120 to the query decomposing rule library, the question set selection program 150 may identify a matching query decomposing rule from within the query decomposing rule library. The question set selection program 150 may act by applying the matching query decomposing rule to the question 120 in order to extract the distinct queries, such as the first query 130 or the second query 140.

At step 220 the question set selection program 150 generates at least two question sets, such as the first question set 160 and the second question set 170. In some embodiments, generating may be expressing the first query 130 and the second query 140 in a natural language, such as English. In some embodiments, generating the first question set 160 and the second question set 170 may be expressing the first query 130 and the second query 140 in a language and/or format that the question answering system can interpret and process.

At step 230 the question set selection program 150 selects one of the question sets that was generated at step 220. For example, the question set selection program 150 may select the first question set 160, which will make the selected question set 180 the first question set 160. Selecting is based on analyzing each question set that was generated at step 220 according to a pre-trained model. The pre-trained model may have been pre-trained using sample questions and generally applicable artificial intelligence training techniques, such as natural language processing. Selecting may be based on testing each of the question sets with the pre-trained model. The pre-trained model may be a model for natural language processing. The pre-trained model may be a term vector model. A term vector model is an algebraic model for representing elements within a text document as vectors. For example, in a term vector model, a number of dimensions are generated, based on keywords, terms, and or elements. The keywords, terms, or elements may be based on elements within the queries extracted at step 210. For example, if one of the queries extracted is a question about the population of Argentina, a term identified by the vector term model may be the word "Argentina." In some embodiments, the pre-trained model provides a score or rank for each of the question sets. In such an embodiment, the question set selection program 150 may select a question set based on which question set has an optimum score. In some embodiments, an optimum score may be based on considering how many questions are in a question set. For example, fewer questions may be optimal because a question set including fewer questions is likely to be less taxing on the question answering system 110, while a question set including too few questions is likely to not accurately and/or completely answer the original question that the question set is attempting to answer. In other embodiments, the optimum score may be based on evaluating how many questions include a specific term. For example, in a question "what is the capital and population of Argentina?", an example question set may be 1) "what is the capital of Argentina?" 2) "what is the population of Argentina?" and 3) "what is the population of Buenos Aires?", which, in another example question set may only be the first two questions. In such an example, the pre-trained model may identify that the third question includes a term that is irrelevant, as it was not identified as a keyword and subsequently give the first question set a lower score than the second question set.

At step 240 the question set selection program 150 presents the selected question set 180 to the question answering system 110. In some embodiments, presenting involves sending the selected question set 180 to the question answering system 110. In some embodiments, presenting also includes presenting the selected question set 180 to a user.

Figure 3:
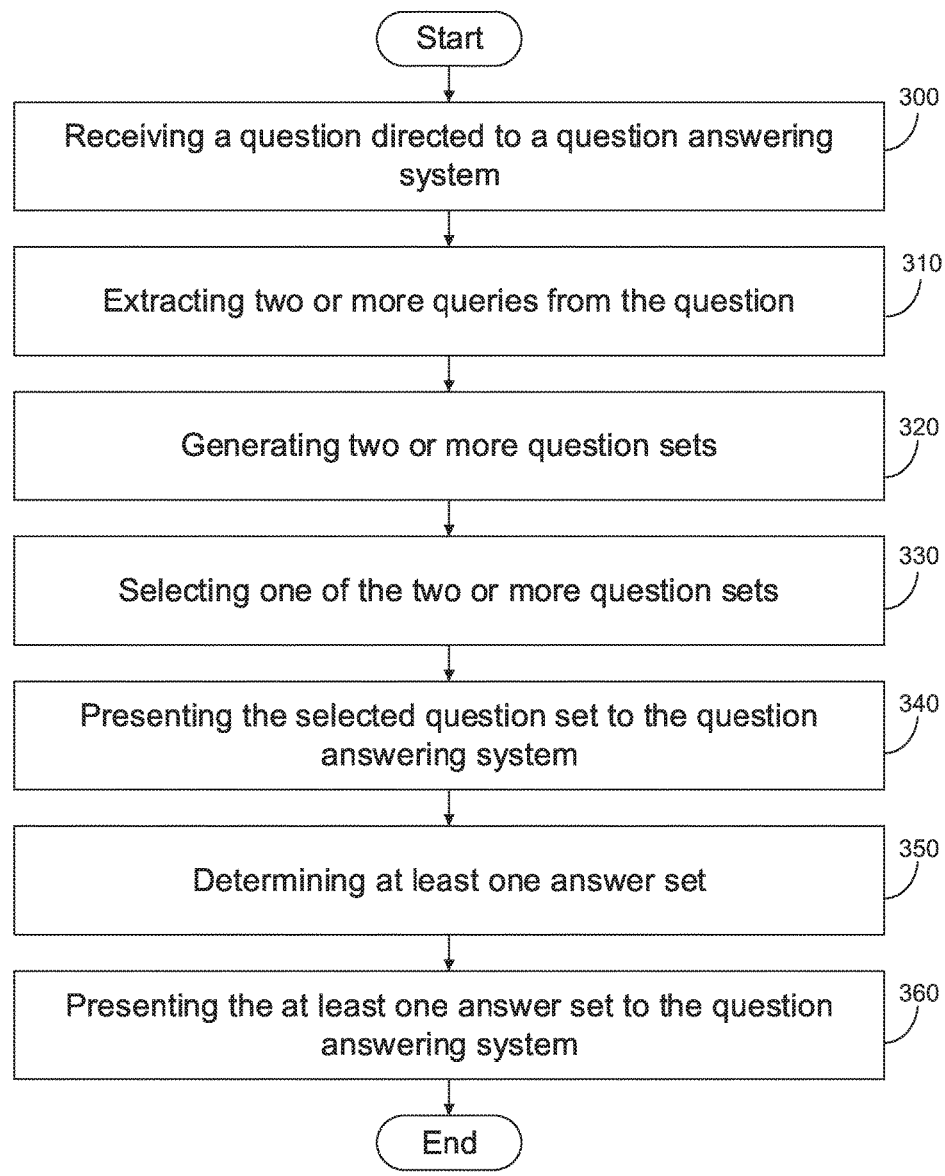
FIG. 3 is a flowchart depicting operational steps for a question set selection program presenting an answer set in accordance with at least one embodiment of the present invention.

FIG. 3 is a flowchart depicting operational steps for a question set selection program presenting an answer set in accordance with at least one embodiment of the present invention.

Step 300, step 310, step 320, step 330, and step 340 are performed in a manner similar to step 200, step 210, step 220, step 230, and step 240.

At step 350 the question set selection program 150 determines at least one answer set. The answer set includes answers to the questions in the selected question set 180. The question set selection program may determine the answer set using a question answering system similar to the question answering system 110. The question set selection program 150 may determine the answer set using a pre-trained model. The question set selection program 150 may determine the answer set by accessing a library, database, or other structured repository of information.

At step 360 the question set selection program 150 present the answer set to the question answering system 110.

Figure 4:
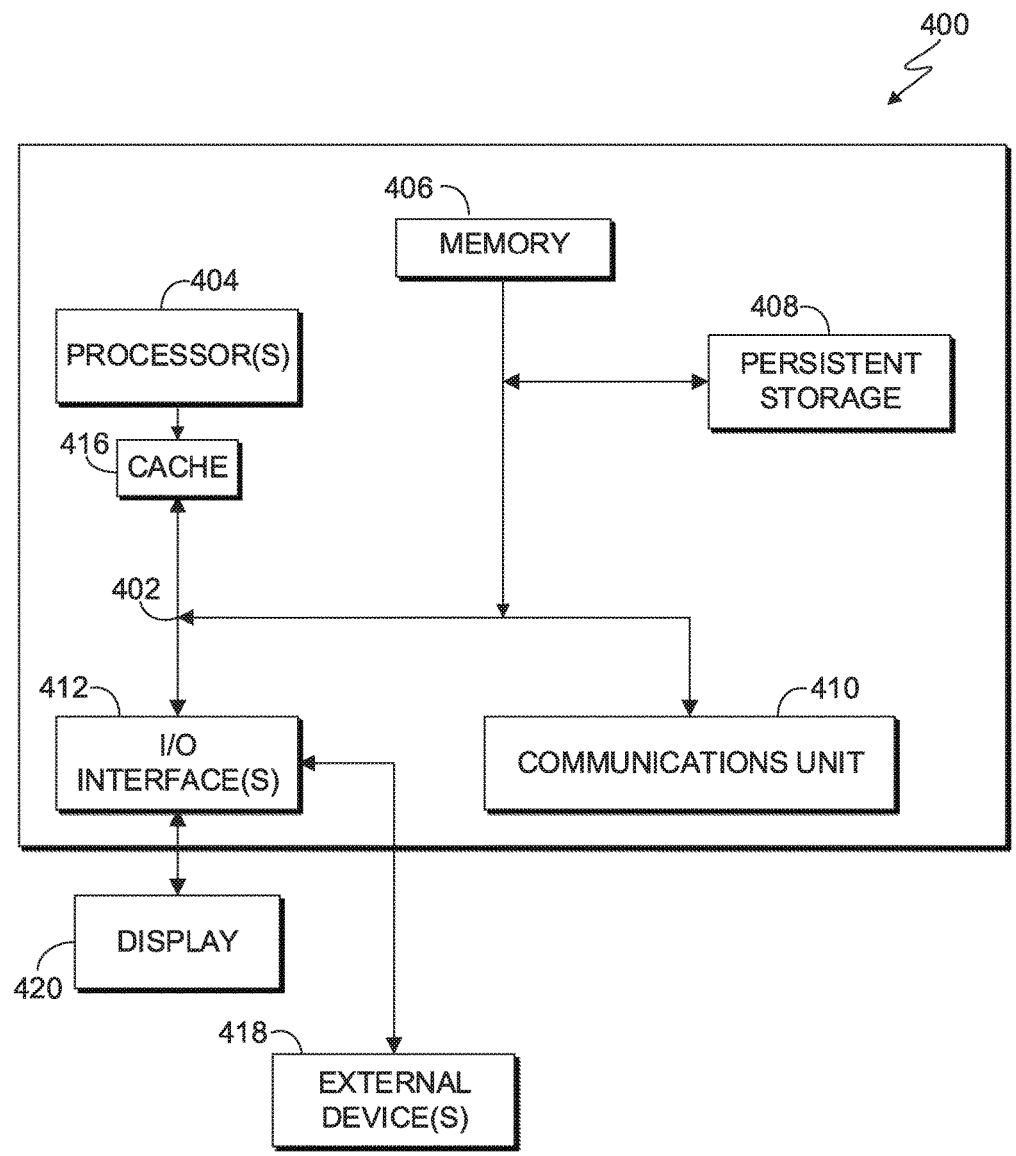
FIG. 4 is a block diagram of components of a computing apparatus suitable for executing a question set selection program in accordance with at least one embodiment of the present invention.

FIG. 4 is a block diagram depicting components of a computer 400 suitable for executing the question set selection program 150. FIG. 4 displays the computer 400, the one or more processor(s) 404 (including one or more computer processors), the communications fabric 402, the memory 406, the RAM 416, the cache 416, the persistent storage 408, the communications unit 410, the I/O interfaces 412, the display 420, and the external devices 418. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the cache 416, the computer processor(s) 404, the memory 406, the persistent storage 408, the communications unit 410, and the input/output (I/O) interface(s) 412. The communications fabric 402 may be implemented with any architecture suitable for passing data and/or control information between the processors 404 (e.g., microprocessors, communications processors, and network processors, etc.), the memory 406, the external devices 418, and any other hardware components within a system. For example, the communications fabric 402 may be implemented with one or more buses or a crossbar switch.

The memory 406 and persistent storage 408 are computer readable storage media. In the depicted embodiment, the memory 406 includes a random access memory (RAM). In general, the memory 406 may include any suitable volatile or non-volatile implementations of one or more computer readable storage media. The cache 416 is a fast memory that enhances the performance of computer processor(s) 404 by holding recently accessed data, and data near accessed data, from memory 406.

Program instructions for the question set selection program 150 may be stored in the persistent storage 408 or in memory 406, or more generally, any computer readable storage media, for execution by one or more of the respective computer processors 404 via the cache 416. The persistent storage 408 may include a magnetic hard disk drive. Alternatively, or in addition to a magnetic hard disk drive, the persistent storage 408 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 410, in these examples, provides for communications with other data processing systems or devices. In these examples, the communications unit 410 may include one or more network interface cards. The communications unit 410 may provide communications through the use of either or both physical and wireless communications links. The question set selection program 150 may be downloaded to the persistent storage 408 through the communications unit 410. In the context of some embodiments of the present invention, the source of the various input data may be physically remote to the computer 400 such that the input data may be received and the output similarly transmitted via the communications unit 410.

The I/O interface(s) 412 allows for input and output of data with other devices that may operate in conjunction with the computer 400. For example, the I/O interface 412 may provide a connection to the external devices 418, which may include a keyboard, keypad, a touch screen, and/or some other suitable input devices. External devices 418 may also include portable computer readable storage media, for example, thumb drives, portable optical or magnetic disks, and memory cards. Software and data used to practice embodiments of the present invention may be stored on such portable computer readable storage media and may be loaded onto the persistent storage 408 via the I/O interface(s) 412. The I/O interface(s) 412 may similarly connect to a display 420. The display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving a question, said question being directed to a domain-specific question answering system, wherein said question is requesting at least two distinct pieces of information;
extracting two or more distinct queries from said question, based on a query decomposing rule library by comparing said question to said query decomposing rule library to identify a matching decomposition rule, said comparing includes using an index scan, using a keyword scan, parsing said query decomposing rule library, and using a segment scan, wherein said query decomposing rule library includes combinations of semantic, syntactic, grammatical, structural, and other predetermined rules for identifying distinct queries within said question;
generating two or more question sets, each of said two or more question sets addressing all of said two or more queries, wherein said generated two or more questions sets are expressed in a language and format that said question answering system can interpret and process, wherein both said first question set and said second question set include at least one question for each of said two or more queries extracted from said question, and wherein said second question set includes at least one question different from said first question set;
selecting one of said two or more question sets to yield a selected question set, based on analyzing each of said two or more question sets according to a pre-trained model, wherein said pre-trained model is a term vector model, wherein said term vector model is an algebraic model for representing elements within a text document as vectors and generates a number of dimensions based on keywords, terms, and elements within said extracted queries, wherein said two or more question sets are selected based on a first optimal score, wherein said first optimal score is based on a number of specific terms and irrelevant terms in questions in each of said two or more question sets, and wherein said irrelevant terms lower said first optimal score;
presenting said selected question set to said question answering system and a user;
determining at least one answer set for said selected question set by accessing a structured repository of information using said pre-trained model; and
presenting said answer set to said question answering system.

2. The computer-implemented method of claim 1, wherein extracting two or more queries from said question is based on one or more semantic rules.

3. The computer-implemented method of claim 1, wherein extracting two or more queries from said question comprises:
  comparing said question against said query decomposing rule library to yield one or more matching query decomposing rules; and
  applying said one or more matching query decomposing rules to said question to yield said two or more queries.

4. The computer-implemented method of claim 1, wherein selecting one of said two or more question sets comprises testing each of said two or more question sets against said pre-trained model.

5. The computer-implemented method of claim 1, wherein selecting one of said two or more question sets comprises:
  scoring each of said two or more question sets, based on testing each of said two or more question sets against said pre-trained model; and
  determining said selected question set by selecting that of said two or more question sets that has a second optimal score.

6. A computer program product comprising:
  one or more computer readable storage media and program instructions stored on said one or more computer readable storage media, said program instructions comprising instructions to:
  receive a question, said question being directed to a domain-specific question answering system, wherein said question is requesting at least two distinct pieces of information;
  extract two or more distinct queries from said question, based on a query decomposing rule library by comparing said question to said query decomposing rule library to identify a matching decomposition rule, wherein said comparing includes using an index scan, using a keyword scan, parsing said query decomposing rule library, and using a segment scan, wherein said query decomposing rule library includes combinations of semantic, syntactic, grammatical, structural, and other predetermined rules for identifying distinct queries within said question;
  generate two or more question sets, each of said two or more question sets addressing all of said two or more queries, wherein said generated two or more questions sets are expressed in a language and format that said question answering system can interpret and process, wherein both said first question set and said second question set include at least one question for each of said two or more queries extracted from said question, and wherein said second question set includes at least one question different from said first question set;
  select one of said two or more question sets to yield a selected question set, based on analyzing each of said two or more question sets according to a pre-trained model, wherein said pre-trained model is a term vector model, wherein said term vector model is an algebraic model for representing elements within a text document as vectors and generates a number of dimensions based on keywords, terms, and elements within said extracted queries, wherein said two or more question sets are selected based on a first optimal score, wherein said first optimal score is based a number of specific terms and irrelevant terms in questions in each of said two or more question sets, and wherein said irrelevant terms lower said first optimal score;
  present said selected question set to said question answering system and a user;
  determine at least one answer set for said selected question set by accessing a structured repository of information using said pre-trained model; and
  present said answer set to said question answering system.

7. The computer program product of claim 6, wherein instructions to extract two or more queries from said question is based on one or more semantic rules.

8. The computer program product of claim 6, wherein instructions to extract two or more queries from said question comprises instructions to:
  compare said question against the query decomposing rule library to yield one or more matching query decomposing rules; and
  apply said one or more matching query decomposing rules to said question to yield said two or more queries.

9. The computer program product of claim 6, wherein instructions to select one of said two or more question sets comprise instructions to test each of said two or more question sets against said pre-trained model.

10. The computer program product of claim 6, wherein instructions to select one of said two or more question sets comprises instructions to:
  score each of said two or more question sets, based on testing each of said two or more question sets against said pre-trained model; and
  determine said selected question set by selecting that of said two or more question sets that has a second optimal score.

11. A computer system comprising:
  one or more computer processors;
  one or more computer readable storage media;
  computer program instructions; and
  said computer program instructions being stored on said computer readable storage media for execution by at least one of said one or more processors, said computer program instructions comprising instructions to:
  receive a question, said question being directed to a domain-specific question answering system, wherein said question is requesting at least two distinct pieces of information;
  extract two or more distinct queries from said question, based on a query decomposing rule library by comparing said question to said query decomposing rule library to identify a matching decomposition rule, wherein said comparing includes using an index scan, using a keyword scan, parsing said query decomposing rule library, and using a segment scan, wherein said query decomposing rule library includes combinations of semantic, syntactic, grammatical, structural, and other predetermined rules for identifying distinct queries within said question;
  generate two or more question sets, each of said two or more question sets addressing all of said two or more queries, wherein said generated two or more questions sets are expressed in a language and format that said question answering system can interpret and process, wherein both said first question set and said second question set include at least one question for each of said two or more queries extracted from said question, and wherein said second question set includes at least one question different from said first question set;
  select one of said two or more question sets to yield a selected question set, based on analyzing each of said two or more question sets according to a pre-trained model, wherein said pre-trained model is a term vector model, wherein said term vector model is an algebraic model for representing elements within a text document as vectors and generates a number of dimensions based on keywords, terms, and elements within said extracted queries, wherein said two or more question sets are selected based on a first optimal score, wherein said first optimal score is based on a number of specific terms and irrelevant terms in questions in each said two or more question sets, and wherein said irrelevant terms lower said first optimal score;

present said selected question set to said question answering system and a user;

determine at least one answer set for said selected question set by accessing a structured repository of information using said pre-trained model; and present said answer set to said question answering system.

12. The computer system of claim 11, wherein instructions to extract two or more queries from said question is based on one or more semantic rules.

13. The computer system of claim 11, wherein instructions to extract two or more queries from said question comprises instructions to:

compare said question against the query decomposing rule library to yield one or more matching query decomposing rules; and apply said one or more matching query decomposing rules to said question to yield said two or more queries.

14. The computer system of claim 11, wherein instructions to select one of said two or more question sets comprise instructions to test each of said two or more question sets against said pre-trained model.

15. The computer system of claim 11, wherein instructions to select one of said two or more question sets comprises instructions to:

score each of said two or more question sets, based on testing each of said two or more question sets against said pre-trained model; and determine said selected question set by selecting that of said two or more question sets that has a second optimal score.

* * * * *